US012110469B2

(12) United States Patent
Fukuta et al.

(10) Patent No.: US 12,110,469 B2
(45) Date of Patent: Oct. 8, 2024

(54) POLYMER COMPOSITION, LUBRICANT ADDITIVE, VISCOSITY INDEX IMPROVER, LUBRICANT COMPOSITION, METHOD FOR PRODUCING POLYMER COMPOSITION, AND METHOD FOR PRODUCING MACROMONOMER

(71) Applicant: Mitsubishi Chemical Corporation, Tokyo (JP)

(72) Inventors: Hiroki Fukuta, Tokyo (JP); Katsufumi Mochizuki, Tokyo (JP); Fumiko Fujie, Tokyo (JP); Takahiro Mukuda, Tokyo (JP); Hiroshi Niino, Tokyo (JP); Eiko Okamoto, Tokyo (JP); Kazunari Matsumura, Tokyo (JP); Hiroko Shinada, Tokyo (JP); Hiroki Hamamoto, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 48 days.

(21) Appl. No.: 17/941,154

(22) Filed: Sep. 9, 2022

(65) Prior Publication Data

US 2023/0063756 A1 Mar. 2, 2023

Related U.S. Application Data

(63) Continuation of application No. PCT/JP2021/012531, filed on Mar. 25, 2021.

(30) Foreign Application Priority Data

Mar. 25, 2020 (JP) .................................. 2020-055130
Mar. 25, 2020 (JP) .................................. 2020-055131

(51) Int. Cl.
*C10M 145/14* (2006.01)
*C10M 169/04* (2006.01)
*C10M 177/00* (2006.01)

(52) U.S. Cl.
CPC ....... *C10M 145/14* (2013.01); *C10M 169/041* (2013.01); *C10M 177/00* (2013.01); *C10M 2209/084* (2013.01)

(58) Field of Classification Search
CPC ............ C10M 145/14; C10M 169/041; C10M 177/00; C10M 2209/084
See application file for complete search history.

(56) References Cited

U.S. PATENT DOCUMENTS

| 5,763,374 A | 6/1998 | Sakai et al. |
| 5,891,831 A | 4/1999 | Matsuya et al. |

(Continued)

FOREIGN PATENT DOCUMENTS

| CN | 105745239 A | 7/2016 |
| CN | 109642180 A | 4/2019 |

(Continued)

OTHER PUBLICATIONS

Office Action issued in related Japanese Patent Application No. 2022-066407 dated Jul. 26, 2022.

(Continued)

*Primary Examiner* — Ellen M McAvoy
(74) *Attorney, Agent, or Firm* — Morgan, Lewis & Bockius LLP

(57) ABSTRACT

A polymer composition, in which a differential distribution value in a differential molecular weight distribution curve of the polymer composition, as measured by gel permeation chromatography, satisfies Equation 1 and a maximum value of a normalized back-scattering intensity of a 35 wt % base oil solution of the polymer composition, where a size q of a (Continued)

scattering vector of small-angle X-ray scattering at 25° C. is in a range of 0.07 nm$^{-1}$ or more and 2 nm$^{-1}$ or less, is 40 cm$^{-1}$ or more.

23 Claims, 1 Drawing Sheet

(56) References Cited

U.S. PATENT DOCUMENTS

| | | | |
|---|---|---|---|
| 2005/0239949 | A1 | 10/2005 | Nakamura et al. |
| 2015/0343392 | A1* | 12/2015 | Hikita .................... C08J 9/0061 521/134 |
| 2016/0237192 | A1 | 8/2016 | Fujiyama et al. |
| 2017/0029548 | A1* | 2/2017 | Kawai ........................ C09J 4/06 |
| 2018/0142055 | A1* | 5/2018 | Masuda .............. C08F 290/046 |
| 2018/0245014 | A1* | 8/2018 | Nakada .............. C10M 169/041 |
| 2019/0203148 | A1 | 7/2019 | Schöller et al. |
| 2019/0233757 | A1* | 8/2019 | Schimossek .............. C08F 8/04 |
| 2020/0010775 | A1* | 1/2020 | Ikari .................... C10M 169/04 |
| 2023/0063756 | A1 | 3/2023 | Fukuta et al. |

FOREIGN PATENT DOCUMENTS

| | | |
|---|---|---|
| EP | 1167478 A1 | 1/2002 |
| EP | 3059269 A1 | 8/2016 |
| EP | 3093334 A1 | 11/2016 |
| JP | H07-286189 A | 10/1995 |
| JP | H08-157855 A | 6/1996 |
| JP | H10-025488 A | 1/1998 |
| JP | H10-298576 A | 11/1998 |
| JP | 2000-355616 A | 12/2000 |
| JP | 2002-167591 A | 6/2002 |
| JP | 2005-336186 A | 12/2005 |
| JP | 2013-203913 A | 10/2013 |
| JP | 2014-152303 A | 8/2014 |
| JP | 2015-209447 A | 11/2015 |
| JP | 2018-070713 A | 5/2018 |
| JP | 2018-159024 A | 10/2018 |
| JP | 2019-104846 A | 6/2019 |
| JP | 7181493 B2 | 12/2022 |
| JP | 7197823 B2 | 12/2022 |
| JP | 7311032 B2 | 7/2023 |
| WO | 03/072621 A1 | 9/2003 |
| WO | 2018/041755 A1 | 3/2018 |

OTHER PUBLICATIONS

Office Action issued in related Japanese Patent Application No. 2022-066406 dated Aug. 23, 2022.
Decision to Grant a Patent issued in Japanese Patent Application No. 2022-510660 dated Jun. 6, 2023.
Office Action issued in related Japanese Patent Application No. 2022-510660 dated Feb. 14, 2023.
Extended European Search Report issued in European Patent Application No. 21774551.2 dated Jul. 17, 2023.
International Search Report issued in related International Patent Application No. PCT/JP2021/012531 dated May 25, 2021.
Office Action issued Dec. 20, 2023 for Chinese Patent Application No. 202180010370.1.
Decision to Grant a Patent issued in corresponding Japanese Patent Application No. 2022-510660 dated Jun. 6, 2023.
Office Action issued in corresponding Japanese Patent Application No. 2022-510660 dated May 9, 2023.
Office Action issued Jun. 21, 2024 for Chinese Patent Application No. 202180010370.1.

* cited by examiner

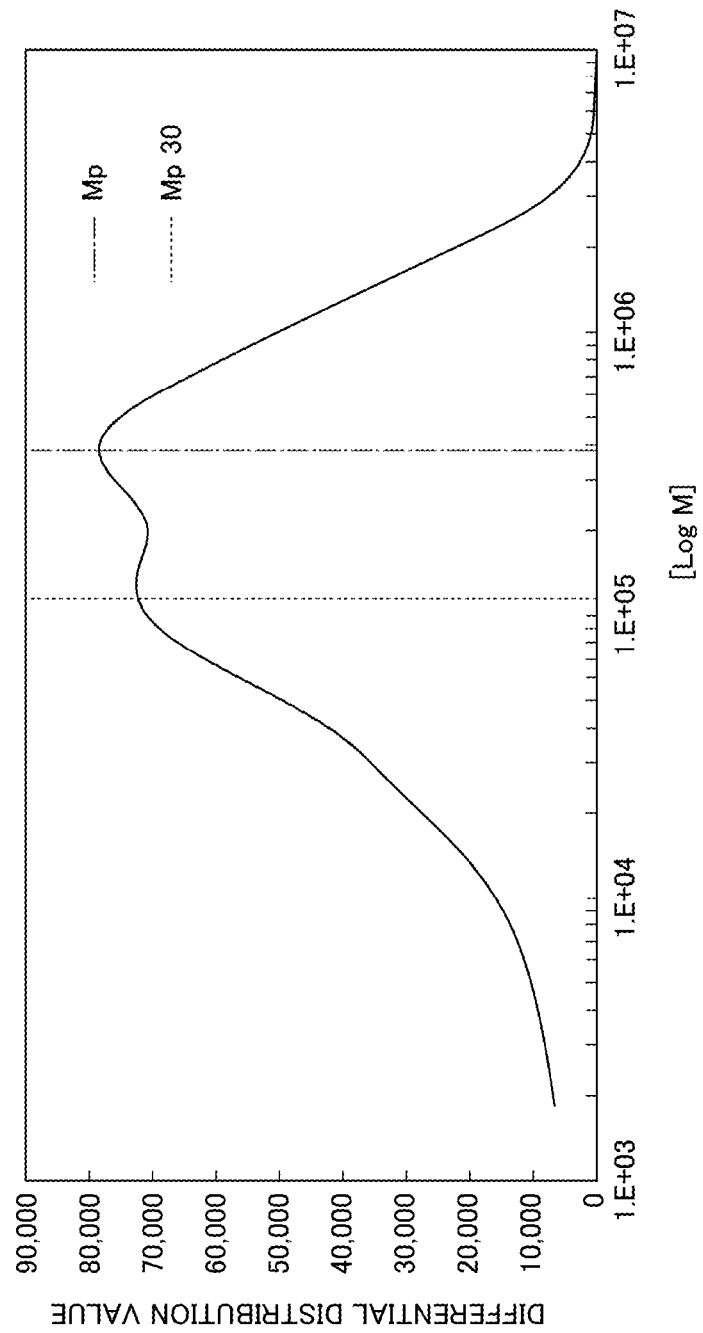

POLYMER COMPOSITION, LUBRICANT ADDITIVE, VISCOSITY INDEX IMPROVER, LUBRICANT COMPOSITION, METHOD FOR PRODUCING POLYMER COMPOSITION, AND METHOD FOR PRODUCING MACROMONOMER

TECHNICAL FIELD

The present invention relates to a polymer composition, a lubricant additive, a viscosity index improver, a lubricant composition, a method for producing a polymer composition, and a method for producing a macromonomer, which are for use in engine oils and the like.

This application is a continuation application of International Application No. PCT/JP2021/012531, filed on Mar. 25, 2021, which claims the benefit of priority of the prior Japanese Patent Application No. 2020-055130, filed on Mar. 25, 2020, and the prior Japanese Patent Application No. 2020-055131, filed on Mar. 25, 2020, the entire contents of which are incorporated herein by reference.

BACKGROUND ART

Lubricant compositions used for engine oil, gear oil, and the like in automobiles or the like require a certain viscosity to be able to protect members over a wide range from low temperatures to high temperatures.

However, the viscosity of lubricant compositions of the related art decreases at high temperatures, such that it is no longer possible to exhibit the intended performance. In addition, in response to the trend toward lower fuel consumption of recent years, there is a desire for lubricants in which the decrease in viscosity at high temperatures is suppressed (to improve the viscosity index) while the viscosity in the operating temperature range is also decreased.

For this reason, for example, Patent Documents 1 and 2 describe viscosity index improvers formed of (meth)acrylate polymers having long-chain alkyl groups.

CITATION LIST

Patent Documents

Patent Document 1

Japanese Unexamined Patent Application, First Publication No. 2013-203913

Patent Document 2

Japanese Unexamined Patent Application, First Publication No. H10-298576

SUMMARY OF INVENTION

Technical Problem

However, the methods described in Patent Document 1 and Patent Document 2 are insufficient in terms of the viscosity index improving effect.

The object of the present invention is to solve the above problems.

Solution to Problem

The gist of the present invention is a polymer composition including a (meth)acrylic copolymer A, in which the (meth)acrylic copolymer A is a copolymer including a constituent unit derived from an alkyl methacrylate a1 of an alkyl group with 5 to 14 carbon atoms, a constituent unit derived from an alkyl acrylate a2 of an alkyl group with 5 to 14 carbon atoms, and a constituent unit derived from an alkyl acrylate a3 of an alkyl group with 1 to 4 carbon atoms.

The gist of the present invention is a polymer composition, in which the differential distribution value in a differential molecular weight distribution curve of the polymer composition, as measured by gel permeation chromatography, satisfies Equation 1 and a maximum value of a normalized back-scattering intensity of a 35 wt % base oil solution of the polymer composition, where a size q of a scattering vector of small-angle X-ray scattering at 25° C. is in a range of 0.07 nm$^{-1}$ or more and 2 nm$^{-1}$ or less, is 40 cm$^{-1}$ or more.

$$dMp30/dMp \geq 0.65 \qquad 1$$

dMp30: A differential distribution value of molecular weight corresponding to 30% of a peak top molecular weight, as measured by gel permeation chromatography.

dMp: A differential distribution value of the peak top molecular weight, as measured by gel permeation chromatography.

Base oil: API standard Group III or Group III Plus

[1]

A polymer composition, in which a differential distribution value represented by Equation 1 in the differential molecular weight distribution curve of the polymer composition, as measured by gel permeation chromatography, is 0.65 or more, preferably 0.70 or more and 1.0 or less, more preferably 0.75 or more and 1.0 or less, and even more preferably 0.80 or more and 1.0 or less, and a maximum value of a normalized back-scattering intensity of a 35 wt % base oil solution of the polymer composition, where a size q of a scattering vector of small-angle X-ray scattering at 25° C. is in a range of 0.07 nm$^{-1}$ or more and 2 nm$^{-1}$ or less, is 40 cm$^{-1}$ or more, more preferably 40 cm$^{-1}$ or more and 1,100 cm$^{-1}$ or less, even more preferably 60 cm$^{-1}$ or more and 500 cm$^{-1}$ or less, and even more preferably 80 cm$^{-1}$ or more and 450 cm$^{-1}$ or less.

$$dMp30/dMp \geq 0.65 \qquad 1$$

dMp30: A differential distribution value of molecular weight corresponding to 30% of a peak top molecular weight, as measured by gel permeation chromatography.

dMp: A differential distribution value of the peak top molecular weight, as measured by gel permeation chromatography.

Base oil: API standard Group III or Group III Plus

[2]

The polymer composition according to [1], in which the polymer composition includes a (meth)acrylic copolymer A, and the (meth)acrylic copolymer A is a copolymer including a constituent unit derived from an alkyl methacrylate a1 of an alkyl group with 5 to 14 carbon atoms, a constituent unit derived from an alkyl acrylate a2 of an alkyl group with 5 to 14 carbon atoms, and a constituent unit derived from an alkyl acrylate a3 of an alkyl group with 1 to 4 carbon atoms.

[3]

The polymer composition according to [2], in which, in the (meth)acrylic copolymer A, a content of the constituent unit derived from the alkyl methacrylate a1 is preferably 1% by mass or more and 50% by mass or less with respect to a total mass of the (meth)acrylic copolymer A, more preferably 5% by mass or more and 45% by mass or less, and even more preferably 10% by mass or more and 40% by mass or less.

[4]

A polymer composition including a (meth)acrylic copolymer A, in which the (meth)acrylic copolymer A is a copolymer including a constituent unit derived from an alkyl methacrylate a1 of an alkyl group with 5 to 14 carbon atoms, a constituent unit derived from an alkyl acrylate a2 of an alkyl group with 5 to 14 carbon atoms, and a constituent unit derived from an alkyl acrylate a3 of an alkyl group with 1 to 4 carbon atoms, and, in the (meth)acrylic copolymer A, a content of the constituent unit derived from the alkyl methacrylate a1 is preferably 1% by mass or more and 50% by mass or less with respect to a total mass of the (meth)acrylic copolymer A, more preferably 5% by mass or more and 45% by mass or less, and even more preferably 10% by mass or more and 40% by mass or less.

[5]

The polymer composition of any one of [2] to [4], in which, in the (meth)acrylic copolymer A, a content of the constituent unit derived from the alkyl acrylate a2 is preferably 1% by mass or more and 50% by mass or less with respect to the total mass of the (meth)acrylic copolymer A, more preferably 5% by mass or more and 45% by mass or less, and even more preferably 10% by mass or more and 40% by mass or less.

[6]

The polymer composition of any one of [2] to [5], in which, in the (meth)acrylic copolymer A, a content of the constituent unit derived from the alkyl acrylate a3 is preferably 30% by mass or more and 80% by mass or less with respect to the total mass of the (meth)acrylic copolymer A, more preferably 35% by mass or more and 75% by mass or less, and even more preferably 40% by mass or more and 70% by mass or less.

[7]

A polymer composition including a (meth)acrylic copolymer A, in which the (meth)acrylic copolymer A is a copolymer including a constituent unit derived from an alkyl methacrylate a1 of an alkyl group with 5 to 14 carbon atoms, a constituent unit derived from an alkyl acrylate a2 of an alkyl group with 5 to 14 carbon atoms, and a constituent unit derived from an alkyl acrylate a3 of an alkyl group with 1 to 4 carbon atoms, and, in the (meth)acrylic copolymer A, a content of the constituent unit derived from the alkyl acrylate a3 is preferably 30% by mass or more and 80% by mass or less with respect to the total mass of the (meth)acrylic copolymer A, more preferably 35% by mass or more and 75% by mass or less, and even more preferably 40% by mass or more and 70% by mass or less.

[8]

The polymer composition according to [7], in which, in the (meth)acrylic copolymer A, a content of the constituent unit derived from the alkyl acrylate a2 is preferably 1% by mass or more and 50% by mass or less with respect to the total mass of the (meth)acrylic copolymer A, more preferably 5% by mass or more and 45% by mass or less, and even more preferably 10% by mass or more and 40% by mass or less.

[9]

The polymer composition according to any one of [2] to [8], in which the (meth)acrylic copolymer A is a copolymer including a constituent unit derived from an alkoxyalkyl (meth)acrylate a4.

[10]

The polymer composition according to [9], in which, in the (meth)acrylic copolymer A, a content of the constituent unit derived from the alkoxyalkyl (meth)acrylate a4 is preferably 1% by mass or more and 30% by mass or less with respect to the total mass of the (meth)acrylic copolymer A, more preferably 3% by mass or more and 25% by mass or less, and even more preferably 5% by mass or more and 20% by mass or less.

[11]

The polymer composition according to any one of [1] to [10], in which a differential distribution value represented by the equation below in the differential molecular weight distribution curve, as measured by gel permeation chromatography, is 0.65 or more, preferably 0.70 or more and 1.0 or less, more preferably 0.75 or more and 1.0 or less, and even more preferably 0.80 or more and 1.0 or less.

$$dMp30/dMp \qquad 1$$

dMp30: A differential distribution value of molecular weight corresponding to 30% of the peak top molecular weight.

dMp: A differential distribution value of the peak top molecular weight.

[12]

The polymer composition according to any one of [1] to [11], in which a normalized back-scattering intensity of a 35 wt % base oil solution of API standard Group III or Group III Plus of the polymer composition, where a size q of a scattering vector of small-angle X-ray scattering at 100° C. is 0.1 $nm^{-1}$, is preferably 1 $cm^{-1}$ or more, more preferably 1.5 $cm^{-1}$ or more and 100.0 $cm^{-1}$ or less, and even more preferably 2 $cm^{-1}$ or more and 50.0 $cm^{-1}$ or less.

[13]

The polymer composition according to any one of [1] to [12], in which a mass average molecular weight of the polymer composition, as measured by gel permeation chromatography, is preferably 50,000 or more and 2,000,000 or less, more preferably 100,000 or more and 1,500,000 or less, and even more preferably 150,000 or more and 1,000,000 or less.

[14]

The polymer composition according to any one of [11] to [13], in which a molecular weight distribution of the polymer composition, as measured by gel permeation chromatography, is preferably 5 or more and 20 or less, more preferably 6 or more and 18 or less, and even more preferably 7 or more and 15 or less.

[15]

The polymer composition according to any one of [2] to [14], in which the (meth)acrylic copolymer A is a graft copolymer.

[16]

The polymer composition according to [15], in which the graft copolymer includes a constituent unit derived from a vinyl radical polymerizable monomer m1 and a constituent unit derived from a macromonomer M other than the vinyl radical polymerizable monomer m1.

[17]

The polymer composition according to [16], in which the vinyl radical polymerizable monomer m1 is an alkyl acrylate a2 of an alkyl group with 5 to 14 carbon atoms and an alkyl acrylate a3 of an alkyl group with 1 to 4 carbon atoms.

[18]

The polymer composition according to [16] or [17], in which the macromonomer M includes a constituent unit derived from a vinyl radical polymerizable monomer m2.

[19]
The polymer composition according to [18], in which the vinyl radical polymerizable monomer m2 includes the alkyl methacrylate a1 having 5 to 14 alkyl group carbon atoms.
[20]
The polymer composition according to any one of [16] to [19], in which the macromonomer M has a structure of Formula 2 below.

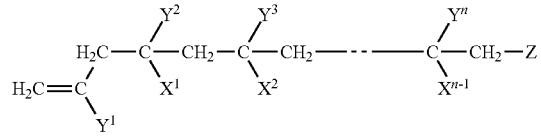

(2)

(In the formula, $X^1$ to $X^{n-1}$ each independently represent a hydrogen atom, a methyl group, or $CH_2OH$, $Y^1$ to $Y^n$ each independently represent a substituent bonded to a vinyl group of the vinyl radical polymerizable monomer m2. Z represents a terminal group, and n represents an integer of 2 to 10,000.)
[21]
The polymer composition according to any one of [16] to [20], in which a number average molecular weight of the macromonomer M, as measured by gel permeation chromatography, is preferably 500 to 30,000, more preferably 1,000 to 25,000, and particularly preferably 2,000 to 20,000.
[22]
A lubricant additive including the polymer composition according to any one of [1] to [21].
[23]
A viscosity index improver including the polymer composition according to any one of [1] to [21].
[24]
A lubricant composition including the polymer composition according to any one of [1] to [21].
[25]
A method for producing the polymer composition according to any one of [1] to [21], in which the polymer composition is produced by polymerizing a monomer mixture including a macromonomer and a vinyl radical polymerizable monomer in a base oil, and the macromonomer is a macromonomer polymerized in the base oil.
[26]
The method for producing a polymer composition according to [25], in which an α-methylstyrene dimer is used as a chain transfer agent.
[27]
A method for producing a macromonomer, in which a monomer mixture including a vinyl radical polymerizable monomer is polymerized in a base oil using a cobalt chain transfer agent.
[28]
A lubricant composition including the polymer composition according to [20] or [21], and a base oil.

Advantageous Effects of Invention

The present invention provides a polymer composition, a lubricant additive, a viscosity index improver, and a lubricant composition, which have a high viscosity index improving effect. In addition, according to the method for producing a polymer composition of the present invention, it is possible to produce a polymer composition which has a high viscosity index improving effect. Furthermore, according to the method for producing a macromonomer of the present invention, it is possible to produce a macromonomer able to produce a polymer composition which has a high viscosity index improving effect.

BRIEF DESCRIPTION OF DRAWINGS

FIG. 1 is a differential molecular weight distribution curve of the polymer composition of the present invention produced in Example 2.

DESCRIPTION OF EMBODIMENTS

In the polymer composition of the present invention, the differential distribution value in the differential molecular weight distribution curve of the polymer composition, as measured by gel permeation chromatography (GPC), satisfies Equation 1 below.

$$dMp30/dMp \geq 0.65 \qquad 1$$

dMp30: A differential distribution value of molecular weight corresponding to 30% of a peak top molecular weight, as measured by gel permeation chromatography.

dMp: A differential distribution value of the peak top molecular weight measured by GPC.

The polymer composition of the present invention is a mixture of polymers with different structures, such as low molecular weight diblock copolymers and high molecular weight graft copolymers, and the differential molecular weight distribution curve thereof has a broad distribution and a plurality of peaks or shoulders. The polymer composition of the present invention satisfies Equation 1, indicating the presence of graft copolymers that contribute to the improvement of the viscosity index. In terms of improving the viscosity index, dMp30/dMp described above is more preferably 0.70 or more and even more preferably 0.75 or more. More specifically, dMp30/dMp is preferably 0.70 or more and 2.0 or less, more preferably 0.75 or more and 1.5 or less, and even more preferably 0.80 or more and 1.0 or less.

In the polymer composition of the present invention, the maximum value of a normalized back-scattering intensity of a 35 wt % base oil solution of the polymer composition, where the size q of the scattering vector of small-angle X-ray scattering at 25° C. is in a range of 0.07 $nm^{-1}$ or more and 2 $nm^{-1}$ or less, is 40 $cm^{-1}$ or more. More specifically, the maximum value of the normalized back-scattering intensity is more preferably 40 $cm^{-1}$ or more and 1,100 $cm^{-1}$ or less, even more preferably 60 $cm^{-1}$ or more and 500 $cm^{-1}$ or less, and yet more preferably 80 $cm^{-1}$ or more and 450 $cm^{-1}$ or less.

The size q of the scattering vector of small-angle X-ray scattering is the reciprocal of the distance between particles in the base oil solution and the scattering intensity represents the quality of particle property; however, when the maximum value of the normalized back-scattering intensity of the polymer composition of the present invention is 40 $cm^{-1}$ or more, the polymer exists dispersed in a fine particle structure in the base oil at 25° C. and it is possible to suppress increases in the viscosity of the base oil at low temperatures.

The base oil is oil of API (American Petroleum Institute) standard Group III or Group III plus base oil. Group III base oils are mineral oils which have a viscosity index (VI)≥120, saturated hydrocarbon content (Vol. %)≥90, and a sulfur content (% by mass)≤0.03 and Group III plus base oils are mineral oils which have a viscosity index (VI)≥135, saturated hydrocarbon content (Vol. %)≥90, and a sulfur content (% by mass)≤0.03.

Furthermore, in the polymer composition of the present invention, a normalized back-scattering intensity of a 35 wt % base oil solution of the polymer composition, where a size q of the scattering vector of small-angle X-ray scattering at 100° C. is 0.1 nm$^{-1}$, is preferably 1 cm$^{-1}$ or more, more preferably 1.5 cm$^{-1}$ or more and 10.0 cm$^{-1}$ or less, and even more preferably 2 cm$^{-1}$ or more and 9.0 cm$^{-1}$ or less. Due to the normalized back-scattering intensity being 1 cm$^{-1}$ or more, a structure remains in which a part where the polymer is not completely dissolved in the base oil even at 100° C. is reduced in size, which makes it easier to improve viscosity even at higher temperatures (150° C.) and under high shear conditions.

In addition, the mass average molecular weight of the polymer composition, as measured by GPC, is preferably 50,000 or more and 2,000,000 or less, more preferably 100,000 or more and 1,500,000 or less, and even more preferably 150,000 or more and 1,000,000 or less, since it is possible to make the solubility in base oils and the viscosity index favorable.

Furthermore, the molecular weight distribution of the polymer composition, as measured by GPC, is preferably 5 or more and 20 or less, more preferably 6 or more and 18 or less, and even more preferably 7 or more and 15 or less, since it is possible to make the solubility in base oils and the viscosity index favorable.

The molecular weight distribution described above is a value calculated as mass average molecular weight (Mw)/number average molecular weight (Mn).

In addition, the polymer composition of the present invention preferably includes the (meth)acrylic copolymer A.

The (meth)acrylic copolymer A means a copolymer in which at least a part of the constituent units are constituent units derived from a (meth)acrylic monomer. The (meth)acrylic copolymer A may further include a constituent unit derived from a monomer other than a (meth)acrylic monomer (for example, styrene or the like).

Examples of the (meth)acrylic monomers include (meth)acrylates containing carboxyl groups such as (meth)acrylic acid, 2-(meth)acryloyloxyethyl succinate, 2-(meth)acryloyloxyethyl maleate, 2-(meth)acryloyloxyethyl phthalate, and 2-(meth)acryloyloxyethyl hexahydrophthalate; (meth)acrylates having alkyl groups such as methyl (meth)acrylate, ethyl (meth)acrylate, n-propyl (meth)acrylate, n-butyl (meth)acrylate, i-propyl (meth)acrylate, i-butyl (meth)acrylate, t-butyl (meth)acrylate, s-butyl (meth)acrylate, n-pentyl (meth)acrylate, n-hexyl methacrylate, n-heptyl methacrylate, n-octyl methacrylate, n-nonyl (meth)acrylate, n-decyl (meth)acrylate, n-undecyl (meth)acrylate, n-dodecyl (meth)acrylate, n-tridecyl (meth)acrylate, n-tetradecyl (meth)acrylate, isoamyl (meth)acrylate, cetyl (meth)acrylate, stearyl (meth)acrylate, behenyl (meth)acrylate, 2-ethylhexyl (meth)acrylate, i-nonyl (meth)acrylate, i-decyl (meth)acrylate, 3-i-propylheptyl (meth)acrylate, i-undecyl (meth)acrylate, 2-t-butylheptyl (meth)acrylate, i-dodecyl (meth)acrylate, i-tridecyl (meth)acrylate, and i-tetradecyl (meth)acrylate; (meth)acrylate having hydroxy groups such as 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, glycerin mono(meth)acrylate, ethylene glycol mono(meth)acrylate, and propylene glycol mono(meth)acrylate; (meth)acrylates having cyclic alkyl groups such as cyclopentyl (meth)acrylate, cyclohexyl (meth)acrylate, isobornyl (meth)acrylate, dicyclopentenyl (meth)acrylate, dicyclopentenoxyethyl (meth)acrylate, dicyclopentanyl (meth)acrylate, and adamantyl (meth)acrylate; (meth)acrylates having aromatic ring structures such as phenyl (meth)acrylate, benzyl (meth)acrylate, phenoxyethyl (meth)acrylate, phenoxydiethylene glycol (meth)acrylate, phenoxypolyethylene glycol (meth)acrylate, nonylphenoxypolyethylene glycol (meth)acrylate, phenoxypolypropylene glycol (meth)acrylate, phenylphenyl (meth)acrylate, phenylphenoxyethyl (meth)acrylate, phenoxybenzyl (meth)acrylate, phenylbenzyl (meth)acrylate, naphthyl (meth)acrylate, and (1-naphthyl)methyl (meth)acrylate; (meth)acrylates having heterocyclic structures such as tetrahydrofurfuryl (meth)acrylate, glycidyl (meth)acrylate, and (meth)acryloyl morpholine; alkoxyalkyl (meth)acrylates such as methoxyethyl (meth)acrylate, ethoxyethyl (meth)acrylate, ethoxydiethylene glycol (meth)acrylate, butoxyethyl (meth)acrylate, 2-ethylhexyl diethylene glycol (meth)acrylate, methoxy polyethylene glycol (meth)acrylate, and methoxy polypropylene glycol (meth)acrylate; 3-(meth)acryloxypropyltrimethoxysilane, 3-(meth)acryloxypropyltriethoxysilane, 2-(meth)acryloyloxyethylacid phosphate, trifluoroethyl (meth)acrylate and heptadecafluorodecyl (meth)acrylate, dimethylaminoethyl (meth)acrylate, diethylaminoethyl (meth)acrylate, (meth)acrylamide, and the like. Two or more of the above may be used in combination.

Furthermore, the (meth)acrylic copolymer A is preferably a copolymer including a constituent unit derived from an alkyl methacrylate a1 of an alkyl group with 5 to 14 carbon atoms, a constituent unit derived from an alkyl acrylate a2 of an alkyl group with 5 to 14 carbon atoms, and a constituent unit derived from an alkyl acrylate a3 of an alkyl group with 1 to 4 carbon atoms.

Examples of the alkyl methacrylate a1 include methacrylates having linear alkyl groups such as n-pentyl methacrylate, n-hexyl methacrylate, n-heptyl methacrylate, n-octyl methacrylate, n-nonyl methacrylate, n-decyl methacrylate, n-undecyl methacrylate, n-dodecyl methacrylate, n-tridecyl methacrylate, and n-tetradecyl methacrylate; methacrylates having branched alkyl groups such as isoamyl methacrylate, 2-ethylhexyl methacrylate, i-nonyl methacrylate, i-decyl methacrylate, 3-i-propylheptyl methacrylate, i-undecyl methacrylate, 2-t-butylheptyl methacrylate, i-dodecyl methacrylate, i-tridecyl methacrylate, and i-tetradecyl methacrylate; methacrylates having cyclic alkyl groups such as cyclopentyl methacrylate, cyclohexyl methacrylate, isobornyl methacrylate, dicyclopentenyl methacrylate, dicyclopentenoxyethyl methacrylate, dicyclopentanyl methacrylate, and adamantyl methacrylate. Two or more of the above may be used in combination.

Due to the excellent viscosity index improving effect, linear or branched alkyl methacrylates with 8 to 14 carbon atoms are preferable, linear or branched alkyl methacrylates with 10 to 14 carbon atoms are more preferable, and linear or branched alkyl methacrylates with 12 to 14 carbon atoms are even more preferable.

In addition, since it is possible to make the solubility in base oils and the viscosity index favorable, the constituent unit derived from the alkyl methacrylate a1 is preferably 1% by mass or more and 50% by mass or less with respect to the total mass of the (meth)acrylic copolymer A, more preferably 5% by mass or more and 45% by mass or less, and even more preferably 10% by mass or more and 40% by mass or less.

In this specification, it is possible to calculate the content of the constituent units from the charging amount of the monomers forming each constituent unit.

Examples of the alkyl acrylate a2 include acrylates having linear alkyl groups such as n-pentyl acrylate, n-hexyl acrylate, n-heptyl acrylate, n-octyl acrylate, n-nonyl acrylate, n-decyl acrylate, n-undecyl acrylate, n-dodecyl acrylate, n-tridecyl acrylate, and n-tetradecyl acrylate; acrylates having branched alkyl groups such as i-amyl acrylate, 2-ethylhexyl acrylate, i-nonyl acrylate, i-decyl acrylate, 3-i-propylheptyl acrylate, i-undecyl acrylate, 2-t-butylheptyl acrylate, i-dodecyl acrylate, i-tridecyl acrylate, and i-tetradecyl acrylate; acrylates having cyclic alkyl groups such as cyclopentyl acrylate, cyclohexyl acrylate, isobornyl acrylate, dicyclopentenyl acrylate, dicyclopentenoxyethyl acrylate, dicyclopentanyl acrylate, and adamantyl acrylate, and the like. Two or more of the above may be used in combination.

Due to the excellent viscosity index improving effect, linear or branched alkyl acrylates with 8 to 14 carbon atoms are preferable, linear or branched alkyl acrylates with 10 to 14 carbon atoms are more preferable, and linear or branched alkyl acrylates with 12 to 14 carbon atoms are even more preferable.

In addition, since it is possible to make the solubility in base oils and the viscosity index favorable, the constituent unit derived from the alkyl acrylate a2 is preferably 1% by mass or more and 50% by mass or less with respect to the total mass of the (meth)acrylic copolymer A, more preferably 5% by mass or more and 45% by mass or less, and even more preferably 10% by mass or more and 40% by mass or less.

Examples of the alkyl acrylate a3 include acrylates having linear alkyl groups such as methyl acrylate, ethyl acrylate, n-propyl acrylate, and n-butyl acrylate; acrylates having branched alkyl groups such as i-propyl acrylate, i-butyl acrylate, t-butyl acrylate, and s-butyl acrylate, and the like. Two or more of the above may be used in combination.

Due to the excellent viscosity index improving effect, alkyl acrylates with 2 to 4 carbon atoms are preferable, alkyl acrylates with 3 to 4 carbon atoms are more preferable, and alkyl acrylates with 4 carbon atoms are even more preferable.

In addition, since it is possible to make the solubility in base oils and the viscosity index favorable, the constituent unit derived from the alkyl acrylate a3 is preferably 30% by mass or more and 80% by mass or less with respect to the total mass of the (meth)acrylic copolymer A, more preferably 35% by mass or more and 75% by mass or less, and even more preferably 40% by mass or more and 70% by mass or less.

In addition, other than the alkyl methacrylate a1, alkyl acrylate a2, and alkyl acrylate a3, the (meth)acrylic copolymer A may include a constituent unit derived from an alkoxyalkyl (meth)acrylate a4 to adjust the solubility in base oils and the viscosity index.

Examples of the alkoxyalkyl (meth)acrylate a4 include methoxyethyl (meth)acrylate, ethoxyethyl (meth)acrylate, ethoxydiethylene glycol (meth)acrylate, butoxyethyl (meth)acrylate, 2-ethylhexyl diethylene glycol (meth)acrylate, methoxy polyethylene glycol (meth)acrylate, methoxy polypropylene glycol (meth)acrylate, and the like. Two or more of the above may be used in combination.

Due to the excellent viscosity index improving effect, methoxyethyl (meth)acrylate, ethoxyethyl (meth)acrylate, ethoxydiethylene glycol (meth)acrylate, and butoxyethyl (meth)acrylate are preferable, methoxyethyl (meth)acrylate and ethoxyethyl (meth)acrylate are more preferable, and methoxyethyl (meth)acrylate is even more preferable.

In addition, since it is possible to make the solubility in base oils and the viscosity index favorable, the constituent unit derived from the alkoxyalkyl (meth)acrylate a4 is preferably 1% by mass or more and 30% by mass or less with respect to the total mass of the (meth)acrylic copolymer A, more preferably 3% by mass or more and 25% by mass or less, and even more preferably 5% by mass or more and 20% by mass or less.

In addition, other than the alkyl methacrylate a1, the alkyl acrylate a2, the alkyl acrylate a3, and the alkoxyalkyl (meth)acrylate a4, the (meth)acrylic copolymer A may also include constituent units derived from other vinyl radical polymerizable monomer to adjust the solubility in base oils and the viscosity index.

Examples of other vinyl radical polymerizable monomers include vinyl compounds such as styrene and vinyl acetate; (meth)acrylates containing carboxyl groups such as (meth)acrylic acid, 2-(meth)acryloyloxyethyl succinate, 2-(meth)acryloyloxyethyl maleate, 2-(meth)acryloyloxyethyl phthalate, and 2-(meth)acryloyloxyethyl hexahydrophthalate; alkyl methacrylates with 1 to 4 carbon atoms such as methyl methacrylate, ethyl methacrylate, n-propyl methacrylate, n-butyl methacrylate, i-propyl methacrylate, i-butyl methacrylate, t-butyl methacrylate, and s-butyl methacrylate; alkyl (meth)acrylates of an alkyl group with 15 or more carbon atoms such as cetyl (meth)acrylate, stearyl (meth)acrylate, and behenyl (meth)acrylate; (meth)acrylate having hydroxy groups such as 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, glycerin mono(meth)acrylate, ethylene glycol mono(meth)acrylate, and propylene glycol mono(meth)acrylate; (meth)acrylates having aromatic ring structures such as phenyl (meth)acrylate, benzyl (meth)acrylate, phenoxyethyl (meth)acrylate, phenoxydiethylene glycol (meth)acrylate, phenoxypolyethylene glycol (meth)acrylate, nonylphenoxypolyethylene glycol (meth)acrylate, phenoxypolypropylene glycol (meth)acrylate, phenylphenyl (meth)acrylate, phenylphenoxyethyl (meth)acrylate, phenoxybenzyl (meth)acrylate, phenylbenzyl (meth)acrylate, naphthyl (meth)acrylate, and (1-naphthyl)methyl (meth)acrylate; (meth)acrylates having heterocyclic structures such as tetrahydrofurfuryl (meth)acrylate, glycidyl (meth)acrylate, and (meth)acryloyl morpholine; 3-(meth)acryloxypropyltrimethoxysilane, 3-(meth)acryloxypropyltriethoxysilane, 2-(meth)acryloyloxyethylacid phosphate, trifluoroethyl (meth)acrylate and heptadecafluorodecyl (meth)acrylate, dimethylaminoethyl (meth)acrylate, diethylaminoethyl (meth)acrylate, (meth)acrylamide, and the like. Two or more of the above may be used in combination.

The (meth)acrylic copolymer A may be a block copolymer, a random copolymer, or a graft copolymer. Among the above, a graft copolymer is preferable, since it is possible to make the viscosity index favorable by including a plurality of constituent units having different solubilities with respect to the base oil. The graft copolymer preferably includes a constituent unit derived from a vinyl radical polymerizable monomer m1 and a constituent unit derived from a macromonomer M other than m1. Two or more macromonomers M may be used in combination. The graft copolymer preferably includes a constituent unit derived from the macromonomer M as a branch component of the graft copolymer. The graft copolymer preferably includes the constituent unit derived from the monomer m1 described below as a trunk component of the graft copolymer.

Examples of the monomer m1 include styrene, vinyl acetate, (meth)acrylate compounds, and the like. Examples of (meth)acrylate compounds include the alkyl methacrylate a1, the alkyl acrylate a2 and the alkyl acrylate a3. Examples of other (meth)acrylate compounds include (meth)acrylates containing carboxyl groups such as (meth)acrylic acid, 2-(meth)acryloyloxyethyl succinate, 2-(meth)acryloyloxyethyl maleate, 2-(meth)acryloyloxyethyl phthalate, and 2-(meth)acryloyloxyethyl hexahydrophthalate; alkyl methacrylates having 1 to 4 carbon atoms such as methyl methacrylate, ethyl methacrylate, n-propyl methacrylate, n-butyl methacrylate, i-propyl methacrylate, i-butyl methacrylate, t-butyl methacrylate, and s-butyl methacrylate; alkyl (meth) acrylates having 15 or more alkyl group carbon atoms such as cetyl (meth)acrylate, stearyl (meth)acrylate, and behenyl (meth)acrylate; (meth)acrylates having hydroxy groups such as 2-hydroxyethyl (meth)acrylate, 2-hydroxypropyl (meth) acrylate, 2-hydroxybutyl (meth)acrylate, 4-hydroxybutyl (meth)acrylate, 6-hydroxyhexyl (meth)acrylate, glycerin mono(meth)acrylate, ethylene glycol mono(meth)acrylate, and propylene glycol mono(meth)acrylate; (meth)acrylates having aromatic ring structures such as phenyl (meth)acrylate, benzyl (meth)acrylate, phenoxyethyl (meth)acrylate, phenoxydiethylene glycol (meth)acrylate, phenoxypolyethylene glycol (meth)acrylate, nonylphenoxypolyethylene glycol (meth)acrylate, phenoxypolypropylene glycol (meth) acrylate, phenylphenyl (meth)acrylate, phenylphenoxyethyl (meth)acrylate, phenoxybenzyl (meth)acrylate, phenylbenzyl (meth)acrylate, naphthyl (meth)acrylate, and (1-naphthyl)methyl (meth)acrylate; (meth)acrylates having heterocyclic structures such as tetrahydrofurfuryl (meth)acrylate, glycidyl (meth)acrylate, and (meth)acryloyl morpholine; alkoxy(meth)acrylates such as methoxyethyl (meth)acrylate, ethoxyethyl (meth)acrylate, and butoxyethyl (meth)acrylate; 3-(meth)acryloxypropyltrimethoxysilane, 3-(meth)acryloxypropyltriethoxysilane, 2-(meth)acryloyloxyethylacid phosphate, trifluoroethyl (meth)acrylate and heptadecafluorodecyl (meth)acrylate, dimethylaminoethyl (meth)acrylate, diethylaminoethyl (meth)acrylate, (meth)acrylamide, and the like. Two or more of the above may be used in combination.

The alkyl methacrylate a1, the alkyl acrylate a2, and the alkyl acrylate a3 may be included in one or both of the monomer m1 and macromonomer M and the vinyl radical polymerizable monomer m1 is preferably the alkyl acrylate a2 and the alkyl acrylate a3 since it is easy to adjust the solubility in base oils.

In addition, as long as the macromonomer M is a polymer having radical polymerizable groups, it is not particularly limited; however, the macromonomer M is preferably a compound including two or more constituent units derived from monomer m2 having vinyl radical polymerizable groups and having radical polymerizable groups at the ends, due to the high designability with respect to the solubility in base oils. The monomer m2 is the same as the vinyl radical polymerizable monomer listed as the monomer m1 above. The monomer m2 preferably includes alkyl methacrylate having 5 or more carbon atoms of alkyl groups due to the excellent viscosity index improving effect, and more preferably includes the alkyl methacrylate a1 due to the excellent solubility in base oils.

Furthermore, the macromonomer M preferably has the structure shown in Formula 2 below in terms of radical polymerization with the monomer m1.

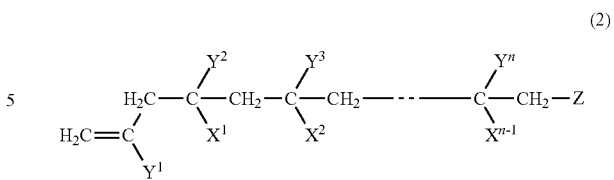

(2)

(In the formula, $X^1$ to $X^{n-1}$ each independently represent a hydrogen atom, a methyl group, or $CH_2OH$, respectively. $Y^1$ to $Y^n$ are substituents bonded to the vinyl group of the (m2) component, which is the monomer constituent unit, and represent, for example, $OR^1$, halogen atom, $COR^2$, $COOR^3$, CN, $CONR^4R^5$, $NHCOR^6$, or $R^7$, $R^1$ to $R^7$ each independently represent a hydrogen atom, an alkyl group, a cycloalkyl group, an aryl group, a cyclic ether group, a heteroaryl group, and the like. Z represents a terminal group and n represents an integer from 2 to 10,000.) Examples of the terminal group Z include a hydrogen atom and a group derived from a radical polymerization initiator, in the same manner as the terminal group of polymers obtained by known radical polymerization.

Since it is possible to make the solubility in base oils and the viscosity index favorable, the number average molecular weight of the macromonomer M, as measured by gel permeation chromatography, is preferably 500 to 30,000, more preferably 1,000 to 25,000, and particularly preferably 2,000 to 20,000.

As the macromonomer M, a macromonomer produced by a known method may be used or a commercially available macromonomer may be used. Examples of methods for producing the macromonomer M include a production method using a cobalt chain transfer agent (U.S. Pat. No. 4,680,352), a method using an α-substituted unsaturated compound such as α-bromomethylstyrene as a chain transfer agent (PCT International Publication No. WO88/04304), a method for chemically bonding polymerizable groups (Japanese Unexamined Patent Application, First Publication No. S60-133007 and U.S. Pat. No. 5,147,952), and a method using thermal decomposition (Japanese Unexamined Patent Application, First Publication No. H11-240854).

The production method using a cobalt chain transfer agent is preferable in terms of having fewer production steps and using a catalyst with a high chain transfer constant. Since the cobalt chain transfer agent has a high chain transfer constant, it is possible to obtain macromonomers for which the molecular weight is controlled with the addition of a small amount thereof.

It is possible to use known cobalt complexes as cobalt chain transfer agents. The amount of the cobalt chain transfer agent is preferably 0.00001 to 0.1 parts by mass with respect to 100 parts by mass of the vinyl radical polymerizable monomer m2, more preferably 0.00005 to 0.05 parts by mass, and particularly preferably 0.0001 to 0.02 parts by mass.

The polymer composition of the present invention preferably has a total light transmittance of 85% to 95%, more preferably 88% to 93%, and even more preferably 90% to 93% in a case of being measured by the method described below in the Examples.

The polymer composition of the present invention preferably has a viscosity index (VI) of 200 to 300 as calculated by the method of JIS-K2283-1993 in a case of being measured by the method described below in the Examples, more preferably 205 to 300, and even more preferably 210 to 300.

<Method for Producing Polymer Composition>

Next, an example of the method for producing a polymer composition of the present invention will be shown.

It is possible to produce the polymer composition of the present invention by polymerizing a monomer mixture including a macromonomer and a vinyl radical polymerizable monomer other than the macromonomer in a base oil by a known method.

Next, another example of the method for producing a polymer composition of the present invention will be shown.

It is possible to produce the polymer composition of the present invention by polymerizing a monomer mixture including the alkyl methacrylate a1, the alkyl acrylate a2, and the alkyl acrylate a3 in a base oil by a known method.

Examples of the base oil include mineral base oils refined from crude oil and chemically synthesized synthetic oils and examples of commercially available products include API standard Group III base oils such as YUBASE 3 manufactured by SK Lubricants Co., Ltd., and API standard Group III Plus base oils such as YUBASE 4 manufactured by SK Lubricants Co., Ltd.

In addition, the monomer mixture may also include the macromonomer M. The macromonomer M is preferably a macromonomer in which a monomer mixture including a vinyl radical polymerizable monomer is polymerized using a cobalt chain transfer agent in the base oil. Since the cobalt chain transfer agent has a high chain transfer constant, it is possible to obtain a macromonomer for which the molecular weight is controlled with the addition of a small amount thereof. In addition, the macromonomer preferably includes the alkyl methacrylate a1 as a constituent unit.

Examples of the vinyl radical polymerizable monomer include the polymerizable monomer m1 and including the alkyl acrylate a2 and the alkyl acrylate a3 is preferable.

In the present invention, by polymerizing a monomer mixture including the macromonomer and a vinyl radical polymerizable monomer other than the macromonomer, the polymer composition of the present invention, which is a mixture of polymers with different structures such as diblock copolymers and graft copolymers, is obtained.

In addition, the polymerization may be performed under known conditions, but it is preferable to use an α-methylstyrene dimer as a chain transfer agent since it is particularly excellent in the effect of suppressing heat generation during polymerization.

<Lubricant Additive>

It is possible to use the polymer composition including the (meth)acrylic copolymer A of the present invention as a lubricant additive to be added to lubricants such as engine oil, gear oil, and hydraulic oil used in industrial machinery, robots, and mobility applications such as automobiles.

Examples of base oils such as the engine oil, gear oil, and hydraulic oil described above include mineral base oils refined from crude oil and chemically synthesized synthetic oils and examples of commercially available products include API standard Group III base oils such as YUBASE 3 manufactured by SK Lubricants Co., Ltd., API standard Group III Plus or the like base oils such as YUBASE 4 manufactured by SK Lubricants Co., Ltd., and the like.

Examples of lubricant additives include antioxidants, viscosity index improvers, pour point depressants, detergent dispersants, corrosion inhibitors, rust inhibitors, extreme pressure agents, oiliness improvers, defoaming agents, emulsifiers, anti-wear agents, friction modifiers, anti-fungal agents, anti-emulsifiers, and the like.

<Viscosity Index Improver>

In addition, it is possible to use the polymer composition of the present invention as a viscosity index improver for the lubricant.

The greater the degree of increase in kinematic viscosity due to the addition of a viscosity index improver at high temperatures and the smaller the increase at low temperatures, the better. In general, it is known that viscosity index improvers formed of (meth)acrylate polymers form a minute particle structure without dissolving completely at low temperatures and, as the solubility increases at higher temperatures, the polymer chain expands and the function described above is expressed. The viscosity index calculated from the kinematic viscosity at low temperatures (for example, 40° C.) and high temperatures (for example, 100° C.) is used as an indicator of the performance of the viscosity index improver.

The viscosity index is a value measured by the method of JIS-K2283-1993 and, the higher the value, the smaller the viscosity change with temperature. In addition, in recent years, in viscosity index improvers, there is a demand for higher values for viscosity (HTHS 150° C. viscosity) under conditions of higher temperatures (150° C.) and high shear, thus, it is preferable that the viscosity improving effect is expected to improve viscosity even at higher temperatures without completely dissolving even at 100° C. It is possible to evaluate the dissolution state at 100° C., for example, by small-angle X-ray scattering measurement (SAXS).

<Lubricant Composition>

Lubricant compositions including the polymer composition of the present invention may contain various additives in addition to the polymer composition of the present invention. Examples of other additives include antioxidants, viscosity index improvers, pour point depressants, detergent dispersants, corrosion inhibitors, rust inhibitors, extreme pressure agents, oiliness improvers, defoaming agents, emulsifiers, anti-wear agents, friction modifiers, anti-fungal agents, anti-emulsifiers, and the like.

The content of the polymer composition of the present invention included in the lubricant composition is preferably 0.01 to 30% by mass when the total mass of the lubricant composition is 100% by mass, more preferably 0.05 to 25% by mass, and most preferably 0.1 to 20% by mass. By the content of the polymer composition being 0.01% by mass or more, the viscosity index of the lubricant composition is improved and, by the content of the polymer composition being 30% by mass or less, the kinematic viscosity of the lubricant composition at low temperatures is suppressed and fuel consumption is improved.

EXAMPLES

A more detailed description will be given below of the present invention using Examples and Comparative Examples. In the Examples, "parts" represents "parts by mass". For the evaluations, measurement was carried out by the following methods.

<Molecular Weight of Polymer Composition>

Gel permeation chromatography (GPC) (HLC-8320, manufactured by Tosoh Corporation) was used for the measurement. After preparing a 0.2% by mass tetrahydrofuran solution of the polymer composition, 10 μl of the solution described above was poured into the apparatus on which columns manufactured by Tosoh Corporation (TSK gel Super HZM-H 2 columns (inner diameter 6.0 mm, length 15 cm) and a TSK guard column Super HZ-H (inner diameter 4.6 mm, length 3.5 cm)) were mounted, measurement was carried out under conditions of a flow rate of 0.5 ml/min, an eluent of tetrahydrofuran (stabilizing agent BHT), and a column temperature of 40° C., and the mass average molecular weight (Mw), the number average molecular weight (Mn), and the peak top molecular weight (Mp) were calculated in standard polystyrene equivalents.

<Molecular Weight of Macromonomer M>

Gel permeation chromatography (GPC) (HLC-8320, manufactured by Tosoh Corporation) was used for the measurement. After preparing a 0.2% by mass tetrahydrofuran solution of the macromonomer M, 10 µl of the solution described above was poured into the apparatus on which columns manufactured by Tosoh Corporation (TSK gel Super HZM-M (inner diameter 4.6 mm, length 15 cm), HZM-M (inner diameter 4.6 mm, length 15 cm), HZ-2000 (inner diameter 4.6 mm, length 15 cm), and TSK guard column Super HZ-L (inner diameter 4.6 mm, length 3.5 cm)) were mounted, measurement was carried out under conditions of a flow rate of 0.35 ml/min, an eluent of tetrahydrofuran (stabilizing agent BHT), and a column temperature of 40° C., and the mass average molecular weight (Mw and the number average molecular weight (Mn) were calculated in standard polystyrene equivalents.

<Small-Angle X-ray Scattering Measurement (SAXS)>

A base oil solution containing 35% by mass of the polymer composition obtained in the Example was placed in a 2 mmφ quartz capillary and small-angle X-ray scattering measurement was carried out at measurement temperatures of 25° C. and 100° C.

Small-angle X-ray scattering measurement was performed using a SAXS point 2.0 system manufactured by Anton Paar GmbH. For the small-angle X-ray scattering measurement conditions, Cu Kα (wavelength 1.54 Å) was used as the X-ray, the exposure time was 30 min (10 min×3 times), the measurement environment was a vacuum, and the camera length was set to 570 mm.

A capillary sample of a base oil solution of (meth)acrylic copolymer was irradiated with X-rays to obtain a 1D scattering profile. In addition, the same measurements as described above were also performed with respect to a 2 mmφ quartz capillary in which only base oil was placed for background correction.

Background correction was performed from the 1D scattering profiles obtained in the above procedure. Specifically, a background-corrected 1D scattering profile was obtained by transmittance-correcting and subtracting the 1D scattering profile of the base oil only from the 1D scattering profile of each sample.

Next, absolute scattering intensity correction of the 1D scattering profile was performed in accordance with the Journal of Physics: Conference Series 247 (2010) 012005. Specifically, as a sample for absolute scattering intensity correction, small-angle X-ray scattering measurements were carried out under the same analytical conditions as described above without placing glassy carbon in a capillary and a 1D scattering profile of glassy carbon was obtained. Next, the 1D scattering profile in a state without the sample was transmittance-corrected and subtracted from the 1D scattering profile of glassy carbon to obtain a background-corrected 1D scattering profile of glassy carbon. The 1D scattering profile after background correction of the glassy carbon was divided by the thickness (cm) and exposure time (S) to acquire the scattering profile ST per unit thickness and unit time.

Next, the differential scattering cross-sections of glassy carbon, which are publicly available from the U.S. National Institute of Standards and Technology (Nist), are prepared and divided by the above scattering profile ST for each q in a range of $0.1\ nm^{-1} \leq q \leq 1\ nm^{-1}$, and coefficient values were obtained for each q. The average values of these coefficient values were used as the scale factor for calculating the differential scattering cross-sections. Next, the background-corrected 1D scattering profile of the base oil solution of each polymer composition was corrected to the scattering intensity per unit thickness and unit time by dividing by the diameter of the capillary (cm) and exposure time (s) to obtain the normalized back-scattering intensity (differential scattering cross-section ($cm^{-1}$)) and normalized back-scattering profile by multiplying by the scale factor obtained in the above method.

<Viscosity Index (VI)>

The evaluation was carried out using a fully automated simple kinematic viscometer (product name; Simple-VIS model, manufactured by Cannon Instrument Company) in accordance with the ASTM D7279 (D445) method. Concentration adjustment was carried out with YUBASE 4 such that the kinematic viscosity (Vk100) of the polymer composition obtained in the present Example at 100° C. was 6.5 mm$^2$/s and the kinematic viscosity (Vk40) at 40° C. of the polymer composition for which the concentration adjustment was carried out was measured.

Using the obtained "Vk100" and "Vk40," the viscosity index (VI) was calculated according to the method of JIS-K2283-1993.

<Solubility in Base Oil>

A base oil solution containing 35% by mass of the polymer obtained in the present Example was interposed between two sheets of 1 mm thick plate glass with a 2 mm thick silicone rubber as a gasket and the total light transmittance was measured using a haze meter (product name: Model HM-150, manufactured by Murakami Color Research Laboratory Co., Ltd.).

Production Example 1

(Synthesis of Co Complex (Cobalt Chain Transfer Agent))

In a synthesis apparatus provided with a stirring apparatus, in a nitrogen atmosphere, 2.00 g (8.03 mmol) of cobalt (II) acetate tetrahydrate (Wako special grade, manufactured by Wako Pure Chemicals Co., Ltd.), 3.86 g (16.1 mmol) of diphenylglyoxime (EP grade, manufactured by Tokyo Chemical Industry Co., Ltd.), and 100 ml of diethyl ether deoxygenated by nitrogen bubbling in advance were placed and stirred at 25° C. for two hours.

Next, 20 ml of a boron trifluoride diethyl ether complex (EP grade, manufactured by Tokyo Chemical Industry Co., Ltd.) was added and further stirred for six hours. The obtained product was filtered and the solid was washed with diethyl ether and dried at 100 MPa or less for 12 hours at 20° C. to obtain 5.02 g (7.93 mmol, yield 99% by mass) of a brown solid Co complex (1).

Production Example 2

In a reaction container provided with a stirrer, cooling tube, and thermometer, 50 parts of YUBASE 4, 50 parts of Acrylic Ester SL (product name: Acrylic Ester SL, manufactured by Mitsubishi Chemical Corporation, mixture of alkyl methacrylate of an alkyl group with 12 carbon atoms and alkyl methacrylate of an alkyl group with 13 carbon atoms), and 0.0015 parts of the Co complex produced in Production Example 1 were added and the result was bubbled with nitrogen while stirring to remove dissolved oxygen. After increasing the liquid temperature to 85° C., a mixed solution formed of Acrylic Ester SL (50 parts) and 0.5 parts of 1,1,3,3-tetramethylbutyl peroxy 2-ethylhexanoate (product name: Perocta O, manufactured by NOF Corporation), which is a polymerization initiator, was added dropwise thereto over a period of four hours. After further holding the temperature at 85° C. for one hour, a mixed solution formed of YUBASE 4 (35 parts) and Perocta O (0.4 parts) was added and the temperature was increased to 95° C. The liquid temperature was held at 95° C. for four hours and then cooled to obtain a YUBASE 4 solution containing 54% by mass of a macromonomer M1. The GPC results of the obtained macromonomers are shown in Table 1.

Production Examples 3 to 5

Macromonomers M2 to M4 were obtained in the same manner as in Production Example 2, except that the amounts of Co complexes were changed, as shown in Table 1. The GPC results are shown in Table 1.

Production Example 6

In a reaction container provided with a stirrer, cooling tube, and thermometer, 40 parts of YUBASE 4, 98 parts of Acrylic Ester SL, 2 parts of methyl methacrylate (product name: Acrylic Ester M, manufactured by Mitsubishi Chemical Corporation), 0.003 parts of the Co complex produced in Production Example 1, and 0.1 parts of t-butyl peroxy-2-ethylhexanoate (NOF Corporation, product name: Perbutyl O) as a polymerization initiator were added and the result was bubbled with nitrogen while stirring to remove dissolved oxygen. The liquid temperature was increased to 90° C. and held for 2.5 hours while being maintained at 90° C. Thereafter, a mixed solution formed of YUBASE 4 (20 parts) and Perbutyl O (0.7 parts) was added dropwise thereto over one hour and the liquid temperature was increased to 105° C. After holding the temperature at 105° C. for one hour, YUBASE 4 (30 parts) was added thereto, cooling was carried out, and a YUBASE 4 solution containing 52.6% by mass of a macromonomer M5 was obtained. The GPC results of the obtained macromonomer are shown in Table 1.

Production Example 7

In a reaction container provided with a stirrer, cooling tube, and thermometer, 60 parts of YUBASE 4, 98 parts of Acrylic Ester SL, 2 parts of methyl methacrylate, 0.005 parts of the Co complex produced in Production Example 1, and 0.1 parts of t-amyl peroxy 2-ethylhexanoate (product name Luperox 575, manufactured by ARKEMA Yoshitomi Ltd.) as a polymerization initiator were added and the result was bubbled with nitrogen while stirring to remove dissolved oxygen. The liquid temperature was increased to 90° C. and held for 2.5 hours while being maintained at 90° C. Thereafter, a mixed solution formed of YUBASE 4 (10 parts) and Perbutyl O (0.7 parts) was added dropwise thereto over one hour and the liquid temperature was increased to 105° C. After holding the temperature at 105° C. for one hour, YUBASE 4 (20 parts) was further added, cooling was carried out, and a YUBASE 4 solution containing 52.6% by mass of a macromonomer M6 was obtained. The GPC results of the obtained macromonomer are shown in Table 1.

Example 1

In a reaction container provided with a stirrer, cooling tube, and thermometer, 78.7 parts of YUBASE 4, 25 parts of Acrylic Ester SL, 52 parts of n-butyl acrylate (product name: nBA, manufactured by Mitsubishi Chemical Corporation), 23 parts of lauryl acrylate (product name: LA, manufactured by Osaka Organic Chemical Industry Ltd.), 0.03 parts of t-butyl peroxy-2 ethylhexanoate (product name: Perbutyl O, manufactured by NOF Corporation) as a polymerization initiator, and 0.03 parts of α-methylstyrene dimer (product name: NOFMER MSD, manufactured by NOF Corporation) as a chain transfer agent were added and the result was bubbled with nitrogen while stirring to remove dissolved oxygen. The liquid temperature was increased to 85° C. and held at 85° C. for two hours, then a mixed solution of YUBASE 4 (40 parts) and Perbutyl O (0.015 parts) were added dropwise thereto over a period of two hours. Furthermore, after holding the temperature at 85° C. for one hour, a mixed solution formed of YUBASE 4 (67 parts) and Perocta O (0.5 parts) was added thereto and the temperature was increased to 95° C. After holding the liquid temperature at 95° C. for one hour, cooling was carried out to obtain a solution containing 35% by mass of a (meth)acrylic copolymer. The evaluation results of the obtained polymer composition are shown in Table 2.

Example 2

In a reaction container provided with a stirrer, cooling tube, and thermometer, 38.2 parts of YUBASE 3, 46.3 parts of a YUBASE 4 solution of the macromonomer M1 obtained in Production Example 2, 52 parts of n-butyl acrylate, 23 parts of lauryl acrylate, 0.015 parts of Perbutyl O as a polymerization initiator, and 0.04 parts of NOFMER MSD as a chain transfer agent were added and the result was bubbled with nitrogen while stirring to remove dissolved oxygen. The liquid temperature was increased to 85° C. and held at 85° C. for two hours, then a mixed solution of YUBASE 3 (42 parts) and Perbutyl O (0.015 parts) was added dropwise thereto over a period of two hours. Furthermore, after holding the temperature at 85° C. for one hour, a mixed solution formed of YUBASE 3 (67.5 parts) and Perocta O (0.5 parts) was added thereto, the temperature was increased to 95° C., and the liquid temperature was held at 95° C. for one hour. After adding YUBASE 3 (16.7 parts), cooling was carried out and a solution containing 35% by mass of the (meth)acrylic copolymer was obtained. The evaluation results of the obtained polymer compositions are shown in Table 2.

Example 3

In a reaction container provided with a stirrer, cooling tube, and thermometer, 7.6 parts of YUBASE 4, 46.3 parts of a YUBASE 4 solution of a macromonomer M2 obtained in Production Example 3, 52 parts of n-butyl acrylate, 23 parts of lauryl acrylate, 0.015 parts of Perbutyl O as a polymerization initiator, and 0.03 parts NOFMER MSD as a chain transfer agent were added and the result was bubbled with nitrogen while stirring to remove dissolved oxygen. The liquid temperature was increased to 85° C. and held at 85° C. for two hours, then a mixed solution of YUBASE 4 (42 parts) and Perbutyl O (0.015 parts) was added dropwise thereto over two hours. Furthermore, after holding the temperature at 85° C. for one hour, a mixed solution formed of YUBASE 4 (67.5 parts) and Perocta O (0.5 parts) was added thereto, the temperature was increased to 95° C., and the liquid temperature was held at 95° C. for one hour. After adding YUBASE 4 (46.7 parts), cooling was carried out and a YUBASE 4 solution containing 35% by mass of the polymer composition was obtained. The results of each evaluation of the obtained polymer compositions are shown in Table 2.

Example 7

In a reaction container provided with a stirrer, cooling tube, and thermometer, 12.5 parts of YUBASE 4, 37 parts of a YUBASE 4 solution of the macromonomer M2 obtained in Production Example 3, 56 parts of n-butyl acrylate, 24 parts of lauryl acrylate, 0.015 parts of Perbutyl O as a polymerization initiator, and 0.04 parts of NOFMER MSD as a chain transfer agent were added and the result was bubbled with nitrogen while stirring to remove dissolved oxygen. The liquid temperature was increased to 85° C. and held at 85° C. for two hours, then a mixed solution of YUBASE 4 (42 parts) and Perbutyl O (0.015 parts) was added dropwise thereto over two hours. Furthermore, after holding the temperature at 85° C. for one hour, a mixed solution formed of YUBASE 4 (67.5 parts) and Perocta O (0.5 parts) was added thereto, the temperature was increased to 95° C., and the liquid temperature was held at 95° C. for one hour. After adding YUBASE 4 (46.7 parts), cooling was carried out to obtain a solution containing 35% by mass of a (meth)acrylic copolymer. The evaluation results of the obtained polymer composition are shown in Table 3.

Example 8

In a reaction container provided with a stirrer, cooling tube, and thermometer, 74 parts of a YUBASE 4 solution of the macromonomer M2 obtained in Production Example 3, 42 parts of n-butyl acrylate, 18 parts of lauryl acrylate, 0.015 parts of Perbutyl O as a polymerization initiator, and 0.02 parts of NOFMER MSD as a chain transfer agent were added and the result was bubbled with nitrogen while stirring to remove dissolved oxygen. The liquid temperature was increased to 85° C. and held at 85° C. for two hours, then a mixed solution of YUBASE 4 (42 parts) and Perbutyl O (0.015 parts) was added dropwise thereto over two hours. Furthermore, after holding the temperature at 85° C. for one hour, a mixed solution formed of YUBASE 4 (67.5 parts) and Perocta O (0.5 parts) was added thereto, the temperature was increased to 95° C., and the liquid temperature was held at 95° C. for one hour. After adding YUBASE 4 (42.2 parts) thereto, cooling was carried out to obtain a solution containing 35% by mass of a (meth)acrylic copolymer. The evaluation results of the obtained polymer compositions are shown in Table 3.

Example 13

In a reaction container provided with a stirrer, cooling tube, and thermometer, 40 parts of YUBASE 4, 47.6 parts of a YUBASE 4 solution of the macromonomer M5 obtained in Production Example 6, 52 parts of n-butyl acrylate, 23 parts of lauryl acrylate, 0.03 parts of Luperox 575 as a polymerization initiator, and 0.03 parts of NOFMER MSD as a chain transfer agent were added and the result was bubbled with nitrogen while stirring to remove dissolved oxygen. The liquid temperature was increased to 85° C. and held at 85° C. for 3.5 hours, then a mixed solution of YUBASE 4 (42 parts) and Luperox 575 (0.015 parts) were added dropwise thereto over two hours. Furthermore, after holding the temperature at 85° C. for one hour, a mixed solution formed of YUBASE 4 (20 parts) and Luperox 575 (0.5 parts) was added dropwise thereto over one hour, then the liquid temperature was increased to 110° C. and the liquid temperature was held at 110° C. for one hour. After adding YUBASE 4 (61.1 parts) thereto, cooling was carried out and a YUBASE 4 solution containing 35% by mass of the polymer composition was obtained. The results of each evaluation of the obtained polymer compositions are shown in Table 4.

Example 14

In a reaction container provided with a stirrer, cooling tube, and thermometer, 6.9 parts of YUBASE 4, 47.6 parts of a YUBASE 4 solution of the macromonomer M6 obtained in Production Example 7, 52 parts of n-butyl acrylate, 23 parts of lauryl acrylate, 0.015 parts of Perbutyl O as a polymerization initiator, and 0.01 parts of NOFMER MSD as a chain transfer agent were added and the result was bubbled with nitrogen while stirring to remove dissolved oxygen. The liquid temperature was increased to 85° C. and held at 85° C. for two hours, then a mixed solution of YUBASE 4 (42 parts) and Perbutyl 0 (0.015 parts) was added dropwise thereto over a period of two hours. Furthermore, after holding the temperature at 85° C. for one hour, a mixed solution formed of YUBASE 4 (67.5 parts) and Perocta O (0.5 parts) was added thereto, the temperature was increased to 95° C., and the liquid temperature was held at 95° C. for one hour. After adding YUBASE 4 (46.7 parts), cooling was carried out and a YUBASE 4 solution containing 35% by mass of the polymer composition was obtained. The results of each evaluation of the obtained polymer compositions are shown in Table 4.

Example 15

In a reaction container provided with a stirrer, cooling tube, and thermometer, 30 parts of YUBASE 4 and 47.6 parts of a YUBASE 4 solution of the macromonomer M6 obtained in Production Example 7 were added and the result was bubbled with nitrogen while stirring to remove dissolved oxygen. The liquid temperature was increased to 85° C. and a mixed solution formed of YUBASE 4 (25 parts), n-butyl acrylate (52 parts), lauryl acrylate (23 parts), and Luperox 575 (0.1 part) as a polymerization initiator was added dropwise thereto over four hours. Further, after holding the temperature at 85° C. for one hour, a mixed solution formed of YUBASE 4 (50 parts) and Luperox 575 (0.5 parts) was added dropwise thereto over 1.5 hours and the liquid temperature was increased to 110° C. After holding the temperature at 110° C. for one hour, YUBASE 4 (58.1 parts) was added thereto, then cooling was carried out, and a YUBASE 4 solution containing 35% by mass of the polymer composition was obtained. The results of each evaluation of the obtained polymer compositions are shown in Table 4.

Example 16

In a reaction container provided with a stirrer, cooling tube, and thermometer, 20 parts of YUBASE 4 and 46.3 parts of YUBASE 4 solution of a macromonomer M3 obtained in Production Example 4 were added and the result was bubbled with nitrogen while stirring to remove dissolved oxygen. The liquid temperature was increased to 85° C. and a mixed solution formed of YUBASE 4 (25 parts), n-butyl acrylate (30 parts), lauryl acrylate (35 parts), 2-methoxyethyl acrylate (product name: 2-MTA, manufactured by Osaka Organic Chemical Industry Ltd.) (10 parts), and Luperox 575 (0.1 part) as a polymerization initiator were added dropwise thereto over four hours. Furthermore, after holding the temperature at 85° C. for one hour, a mixed solution formed of YUBASE 4 (60 parts) and Luperox 575 (0.5 parts) was added dropwise thereto over 1.5 hours and the liquid temperature was increased to 110° C. After holding the temperature at 110° C. for one hour, YUBASE 4 (59.4 parts) was added thereto, then cooling was carried out, and a YUBASE 4 solution containing 35% by mass of the polymer composition was obtained. The results of each evaluation of the obtained polymer compositions are shown in Table 4.

Examples 4 to 6, 9 to 12 and Comparative Example 1

Polymer compositions were obtained in the same manner as in Example 3, except that the type of macromonomer used, the type and amount of the monomer, and the amount of α-methylstyrene dimer were changed to the contents in Table 2 to Table 5. The results of each evaluation of the obtained polymer compositions are shown in Tables 2 to 5.

Examples 17 and 18

Polymer compositions were obtained in the same manner as in Example 16, except that the type of macromonomer used and the type and amount of monomer were changed to contents in Table 4. The results of each evaluation of the obtained polymer compositions are shown in Table 4.

Comparative Examples 2 to 6

Polymer compositions were obtained in the same manner as in Example 1, except that the type and amount of monomer used and the amount of α-methylstyrene dimer were changed to the contents in Table 5. The results of each evaluation of the obtained polymer compositions are shown in Table 5.

Comparative Examples 1 to 5 had a low viscosity index.

TABLE 1

| | | Production Example 2 | Production Example 3 | Production Example 4 | Production Example 5 | Production Example 6 | Production Example 7 |
|---|---|---|---|---|---|---|---|
| Macromonomer (M) No. | | M1 | M2 | M3 | M4 | M5 | M6 |
| Vinyl radical polymerizable monomer (m2) (parts by mass) | SLMA | 100 | 100 | 100 | 100 | 98 | 98 |
| | MMA | — | — | — | — | 2 | 2 |
| Co complex (parts by mass) | | 0.0015 | 0.002 | 0.0025 | 0.0035 | 0.003 | 0.005 |
| GPC evaluation | Mw | 36,000 | 20,000 | 14,000 | 10,200 | 22,600 | 10,700 |
| | Mn | 14,000 | 11,000 | 9,000 | 6,000 | 10,200 | 5,500 |
| | Mw/Mn | 2.6 | 1.8 | 1.6 | 1.7 | 2.3 | 1.9 |

TABLE 2

| | | | Example 1 | Example 2 | Example 3 | Example 4 | Example 5 | Example 6 |
|---|---|---|---|---|---|---|---|---|
| Macromonomer | No. of macromonomer (M) used | | — | M1 | M2 | M3 | M3 | M4 |
| | Mn of macromonomer (M) used | | — | 14,000 | 11,000 | 9,000 | 9,000 | 6,000 |
| Charging amount | α-methylstyrene dimer (parts by mass) | | 0.03 | 0.04 | 0.03 | 0.02 | 0.01 | 0.01 |
| | Vinyl radical polymerizable monomer (m1) (parts by mass) | | 100 | 75 | 75 | 75 | 75 | 75 |
| | Macromonomer (M) (parts by mass) | | — | 25 | 25 | 25 | 25 | 25 |
| Composition of (meth)acrylic copolymer | Alkyl methacrylate (a1) of alkyl group with 5 to 14 carbon atoms (% by mass) | SLMA | 25 | 25 | 25 | 25 | 25 | 25 |
| | Alkyl acrylate (a2) of alkyl group with 5 to 14 carbon atoms (% by mass) | LA | 23 | 23 | 23 | 23 | 19 | 23 |
| | | EHA | — | — | — | — | — | — |
| | Alkyl acrylate (a3) of alkyl group with 1 to 4 carbon atoms (% by mass) | BA | 52 | 52 | 52 | 52 | 56 | 52 |
| | | EA | — | — | — | — | — | — |
| | Alkoxyalkyl (meth)acrylate (a4) (% by mass) | 2-MTA | — | — | — | — | — | — |
| | Other vinyl radical polymerizable monomer (% by mass) | MMA | — | — | — | — | — | — |
| | | BMA | — | — | — | — | — | — |
| Evaluation | Mw (ten thousand) | | 34 | 40 | 56 | 41 | 58 | 32 |
| | Mn (ten thousand) | | 3.8 | 4.1 | 4.8 | 4.7 | 5.1 | 4.6 |
| | Mw/Mn | | 8.9 | 9.8 | 11.7 | 8.7 | 11.4 | 7.0 |
| | Mp (ten thousand) | | 35 | 33 | 38 | 37 | 48 | 30 |
| | dMp30/dMp | | 0.71 | 0.91 | 0.86 | 0.80 | 0.83 | 0.79 |
| | Maximum value ($cm^{-1}$) of normalized back-scattering intensity at q = 0.07 to 2 $nm^{-1}$ at 25° C. | | 47.0 | 411.6 | 481.9 | 98.0 | 336.1 | 60.1 |
| | Normalized back-scattering intensity ($cm^{-1}$) at q = 0.1 $nm^{-1}$ at 100° C. | | 0.60 | 2.7 | 6.9 | 1.5 | 8.6 | 1.0 |
| | Total light transmittance (%) | | 89.9 | 90.8 | 90.8 | 90.9 | 90.7 | 90.6 |
| | Viscosity index (VI) | | 221 | 219 | 230 | 230 | 220 | 216 |

TABLE 3

| | | | Example 7 | Example 8 | Example 9 | Example 10 | Example 11 | Example 12 |
|---|---|---|---|---|---|---|---|---|
| Macromonomer | No. of macromonomer (M) used | | M2 | M2 | M3 | M3 | M3 | M3 |
| | Mn of macromonomer (M) used | | 11,000 | 11,000 | 9,000 | 9,000 | 9,000 | 9,000 |
| Charging amount | α-methylstyrene dimer (parts by mass) | | 0.04 | 0.02 | 0.01 | 0.01 | 0.02 | 0.02 |
| | Vinyl radical polymerizable monomer (m1) (parts by mass) | | 80 | 60 | 75 | 75 | 75 | 75 |
| | Macromonomer (M) (parts by mass) | | 20 | 40 | 25 | 25 | 25 | 25 |
| Composition of (meth)acrylic copolymer | Alkyl methacrylate (a1) of alkyl group with 5 to 14 carbon atoms (% by mass) | SLMA | 20 | 40 | 25 | 25 | 25 | 25 |
| | Alkyl acrylate (a2) of alkyl group with 5 to 14 carbon atoms (% by mass) | LA | 24 | 18 | 28 | 15 | — | 40 |
| | | EHA | — | — | — | — | 40 | — |
| | Alkyl acrylate (a3) of alkyl group with 1 to 4 carbon atoms (% by mass) | BA | 56 | 42 | 47 | 60 | 35 | — |
| | | EA | — | — | — | — | — | 35 |
| | Alkoxyalkyl (meth)acrylate (a4) (% by mass) | 2-MTA | — | — | — | — | — | — |
| | Other vinyl radical polymerizable monomer (% by mass) | MMA | — | — | — | — | — | — |
| | | BMA | — | — | — | — | — | — |
| Evaluation | Mw (ten thousand) | | 56 | 52 | 45 | 66 | 42 | 50 |
| | Mn (ten thousand) | | 5.3 | 4.9 | 4.7 | 4.8 | 5.0 | 5.0 |
| | Mw/Mn | | 10.6 | 10.6 | 9.6 | 13.8 | 8.4 | 10.0 |
| | Mp (ten thousand) | | 48 | 41 | 36 | 27 | 40 | 41 |
| | dMp30/dMp | | 0.80 | 0.87 | 0.80 | 0.87 | 0.81 | 0.84 |
| | Maximum value (cm$^{-1}$) of normalized back-scattering intensity at q = 0.07 to 2 nm$^{-1}$ at 25° C. | | 1024.4 | 80.7 | 51.8 | 680.4 | 238.3 | 82.1 |
| | Normalized back-scattering intensity (cm$^{-1}$) at q = 0.1 nm$^{-1}$ at 100° C. | | 7.3 | 4.6 | 0.72 | 43 | 3.4 | 3.8 |
| | Total light transmittance (%) | | 90.7 | 91.1 | 90.7 | 90.7 | 90.9 | 91.2 |
| | Viscosity index (VI) | | 236 | 234 | 236 | 217 | 243 | 222 |

TABLE 4

| | | | Example 13 | Example 14 | Example 15 | Example 16 | Example 17 | Example 18 |
|---|---|---|---|---|---|---|---|---|
| Macromonomer | No. of macromonomer (M) used | | M5 | M6 | M6 | M3 | M2 | M3 |
| | Mn of macromonomer (M) used | | 9,700 | 5,500 | 5,500 | 9,000 | 11,000 | 9,000 |
| Charging amount | α-methylstyrene dimer (parts by mass) | | 0.03 | 0.01 | — | — | — | — |
| | Vinyl radical polymerizable monomer (m1) (parts by mass) | | 75 | 75 | 75 | 75 | 75 | 75 |
| | Macromonomer (M) (parts by mass) | | 25 | 25 | 25 | 25 | 25 | 25 |
| Composition of (meth)acrylic copolymer | Alkyl methacrylate (a1) of alkyl group with 5 to 14 carbon atoms (% by mass) | SLMA | 24.5 | 24.5 | 24.5 | 25 | 25 | 25 |
| | Alkyl acrylate (a2) of alkyl group with 5 to 14 carbon atoms (% by mass) | LA | 23 | 23 | 23 | 35 | 35 | 30 |
| | | EHA | — | — | — | — | — | — |
| | Alkyl acrylate (a3) of alkyl group with 1 to 4 carbon atoms (% by mass) | BA | 52 | 52 | 52 | 30 | 30 | 35 |
| | | EA | — | — | — | — | — | — |
| | Alkoxyalkyl (meth)acrylate (a4) (% by mass) | 2-MTA | — | — | — | 10 | 10 | 10 |
| | Other vinyl radical polymerizable monomer (% by mass) | MMA | 0.5 | 0.5 | 0.5 | — | — | — |
| | | BMA | — | — | — | — | — | — |
| Evaluation | Mw (ten thousand) | | 81 | 78 | 64 | 63 | 62 | 73 |
| | Mn (ten thousand) | | 5.1 | 5.6 | 4.3 | 4.6 | 4.7 | 4.6 |
| | Mw/Mn | | 15.9 | 13.9 | 14.9 | 13.7 | 13.2 | 15.9 |
| | Mp (ten thousand) | | 40 | 41 | 39 | 39 | 42 | 42 |
| | dMp30/dMp | | 0.96 | 0.81 | 0.95 | 0.96 | 0.99 | 0.94 |
| | Maximum value (cm$^{-1}$) of normalized back-scattering intensity at q = 0.07 to 2 nm$^{-1}$ at 25° C. | | 405.3 | 80.1 | 81.0 | 41.3 | 103.3 | 142.1 |
| | Normalized back-scattering intensity (cm$^{-1}$) at q = 0.1 nm$^{-1}$ at 100° C. | | 5.7 | 1.0 | 1.3 | 1.1 | 2.3 | 3.8 |
| | Total light transmittance (%) | | 90.8 | 91.1 | 91.2 | 91.2 | 90.9 | 90.9 |
| | Viscosity index (VI) | | 229 | 236 | 241 | 234 | 232 | 234 |

TABLE 5

|  |  | Comparative Example 1 | Comparative Example 2 | Comparative Example 3 | Comparative Example 4 | Comparative Example 5 | Comparative Example 6 |
|---|---|---|---|---|---|---|---|
| Macromonomer | No. of macromonomer (M) used | M3 | — | — | — | — | — |
|  | Mn of macromonomer (M) used | 9,000 | — | — | — | — | — |
| Charging amount | α-methylstyrene dimer (parts by mass) | 0.02 | 0.02 | 0.02 | 0.02 | 0.03 | 0.02 |
|  | Vinyl radical polymerizable monomer (m1) (parts by mass) | 75 | 100 | 100 | 100 | 100 | 100 |
|  | Macromonomer (M) (parts by mass) | 25 | — | — | — | — | — |
| Composition of (meth)acrylic copolymer | Alkyl methacrylate (a1) of alkyl group with 5 to 14 carbon atoms (% by mass) SLMA | 25 | 77 | 25 | — | 48 | 80 |
|  | Alkyl acrylate (a2) of alkyl group with 5 to 14 carbon atoms (% by mass) LA | 40 | 23 | 40 | 65 | — | 10 |
|  | EHA | — | — | — | — | — | — |
|  | Alkyl acrylate (a3) of alkyl group with 1 to 4 carbon atoms (% by mass) BA | — | — | — | 35 | 52 | 10 |
|  | EA | — | — | — | — | — | — |
|  | Alkoxyalkyl (meth)acrylate (a4) (% by mass) 2-MTA | — | — | — | — | — | — |
|  | Other vinyl radical polymerizable monomer (% by mass) MMA | — | — | — | — | — | — |
|  | BMA | 35 | — | 35 | — | — | — |
| Evaluation | Mw (ten thousand) | 9.6 | 22 | 39 | 47 | 39 | 22 |
|  | Mn (ten thousand) | 2.8 | 4.2 | 3.8 | 4.4 | 5.1 | 4.4 |
|  | Mw/Mn | 3.4 | 5.2 | 10.3 | 10.7 | 7.6 | 5.0 |
|  | Mp (ten thousand) | 8.8 | 17 | 12 | 44 | 45 | 15 |
|  | dMp30/dMp | 0.62 | 0.59 | 0.51 | 0.71 | 0.63 | 0.46 |
|  | Maximum value ($cm^{-1}$) of normalized back-scattering intensity at q = 0.07 to 2 $nm^{-1}$ at 25° C. | 37.5 | 0.2 | 2.27 | 0.50 | 0.95 | 0.24 |
|  | Normalized back-scattering intensity ($cm^{-1}$) at q = 0.1 $nm^{-1}$ at 100° C. | 0.73 | 0.12 | 0.26 | 0.17 | 0.25 | 0.25 |
|  | Total light transmittance (%) | 89.8 | 91.0 | 89.5 | 90.9 | 89.8 | 91.2 |
|  | Viscosity index (VI) | 194 | 170 | 200 | 199 | 187 | 172 |

The abbreviations in Tables 1 to 5 are as follows.
SLMA: Mixture of alkyl methacrylate of alkyl group with 12 carbon atoms and alkyl methacrylate of alkyl group with 13 carbon atoms (product name: Acrylic Ester SL, manufactured by Mitsubishi Chemical Corporation)
MMA: Methyl methacrylate (product name: Acrylic Ester M, manufactured by Mitsubishi Chemical Corporation)
EHA: 2-ethylhexyl acrylate (product name: 2-ethylhexyl acrylate, manufactured by Mitsubishi Chemical Corporation)
Co complex: Cobalt chain transfer agent obtained in Production Example 1.
α-methylstyrene dimer (product name: NOFMER MSD, manufactured by NOF Corporation)
YUBASE 3 (API standard Group III base oil, manufactured by SK Lubricants Co., Ltd.)
YUBASE 4 (API standard Group III Plus base oil, manufactured by SK Lubricants Co., Ltd.)
LA: Lauryl acrylate (product name: LA, manufactured by Osaka Organic Chemical Industry Ltd.)
BA: n-butyl acrylate (product name: Butyl acrylate, manufactured by Mitsubishi Chemical Corporation)
EA: Ethyl acrylate (product name: ethyl acrylate, manufactured by Mitsubishi Chemical Corporation)
BMA: n-butyl methacrylate (product name: Acrylic Ester B, manufactured by Mitsubishi Chemical Corporation)
2-MTA: 2-methoxyethyl acrylate (product name: 2-MTA, manufactured by Osaka Organic Chemical Industry Ltd.)

INDUSTRIAL APPLICABILITY

The present invention provides a polymer composition, a lubricant additive, a viscosity index improver, and a lubricant composition, which have a high viscosity index improving effect.

In addition, according to the method for producing a polymer composition of the present invention, it is possible to produce a polymer composition which has a high viscosity index improving effect.

Furthermore, according to the method for producing a macromonomer of the present invention, it is possible to produce a macromonomer able to produce a polymer composition which has a high viscosity index improving effect. It is possible to provide a polymer composition.

What is claimed is:
1. A polymer composition, comprising a (meth)acrylic copolymer A including;
a constituent unit derived from an alkyl methacrylate a1 of an alkyl group having 5 to 14 carbon atoms,
a constituent unit derived from an alkyl acrylate a2 of an alkyl group having 5 to 14 carbon atoms, and
a constituent unit derived from an alkyl acrylate a3 of an alkyl group having 1 to 4 carbon atoms,
wherein the (meth)acrylic copolymer A further comprises a graft copolymer structure including,
a constituent unit derived from a vinyl radical polymerizable monomer m1 as a main chain of the graft copolymer structure, and
a constituent unit derived from a macromonomer M other than the vinyl radical polymerizable monomer m1 as a branch component of the graft copolymer structure,
a differential distribution value in a differential molecular weight distribution curve of the polymer composition, as measured by gel permeation chromatography, satisfies Equation 1, and
a maximum value of a normalized back-scattering intensity of a 35 wt % base oil solution of the polymer composition is 40 $cm^{-1}$ or more, where a size q of a scattering vector of small-angle X-ray scattering at 25° C. is in a range of 0.07 nm$^{-1}$ or more and 2 nm$^{-1}$ or less, $$dMp30/dMp \geq 0.65 \quad \text{Equation 1}$$

wherein in Equation 1, dMp30 is a differential distribution value of molecular weight corresponding to 30% of a peak top molecular weight, as measured by gel permeation chromatography, dMp is a differential distribution value of the peak top molecular weight, as measured by gel permeation chromatography, and the 35 wt % base oil solution uses API standard Group III or Group III Plus as a base oil.

2. The polymer composition according to claim 1, wherein the (meth)acrylic copolymer A includes 1 to 50% by mass of the constituent unit derived from the alkyl methacrylate a1 with respect to a total mass of the (meth)acrylic copolymer A.

3. The polymer composition of claim 1, wherein the (meth)acrylic copolymer A includes 1 to 50% by mass of the constituent unit derived from the alkyl acrylate a2 with respect to a total mass of the (meth)acrylic copolymer A.

4. The polymer composition of claim 1, wherein the (meth)acrylic copolymer A includes 30 to 80% by mass of the constituent unit derived from the alkyl acrylate a3 with respect to a total mass of the (meth)acrylic copolymer A.

5. The polymer composition according to claim 1, wherein the (meth)acrylic copolymer A is a copolymer including a constituent unit derived from an alkoxyalkyl (meth)acrylate a4.

6. The polymer composition according to claim 5, wherein the (meth)acrylic copolymer A includes 1 to 30% by mass of the constituent unit derived from the alkoxyalkyl (meth)acrylate a4 with respect to a total mass of the (meth)acrylic copolymer A.

7. The polymer composition according to claim 1, wherein a normalized back-scattering intensity of a 35 wt % base oil solution of API standard Group III or Group III Plus of the polymer composition is 1 cm$^{-1}$ or more, where a size q of a scattering vector of small-angle X-ray scattering at 100° C. is 0.1 nm$^{-1}$.

8. The polymer composition according to claim 1, wherein a mass average molecular weight of the polymer composition, as measured by gel permeation chromatography, is 50,000 to 2,000,000.

9. The polymer composition according to claim 1, wherein a molecular weight distribution of the polymer composition, as measured by gel permeation chromatography, is 5 to 20.

10. The polymer composition according to claim 1, wherein the vinyl radical polymerizable monomer m1 is an contains the alkyl acrylate a2 of an alkyl group with 5 to 14 carbon atoms and an the alkyl acrylate a3 of an alkyl group with 1 to 4 carbon atoms.

11. The polymer composition according to claim 1, wherein the macromonomer M includes a constituent unit derived from a vinyl radical polymerizable monomer m2.

12. The polymer composition according to claim 11, wherein the vinyl radical polymerizable monomer m2 includes the alkyl methacrylate a1 of an alkyl group with 5 to 14 carbon atoms.

13. The polymer composition according to claim 1, wherein the macromonomer M has a structure of Formula 2 below,

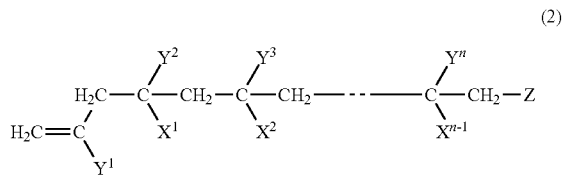

In the formula, $X^1$ to $X^{n-1}$ each independently represent a hydrogen atom, a methyl group, or $CH_2OH$, $Y^1$ to $Y^n$ each independently represent a substituent bonded to a vinyl group of the vinyl radical polymerizable monomer m2, Z represents a terminal group, and n represents an integer of 2 to 10,000.

14. The polymer composition according to claim 1, wherein a number average molecular weight of the macromonomer M, as measured by gel permeation chromatography, is 500 to 30,000.

15. A lubricant additive comprising:
the polymer composition according to claim 1.

16. A viscosity index improver comprising:
the polymer composition according to claim 1.

17. A friction modifier comprising:
the polymer composition according to claim 1.

18. A lubricant composition comprising:
the polymer composition according to claim 1.

19. A method for producing the polymer composition according to claim 1,
wherein the polymer composition is produced by polymerizing a monomer mixture including a macromonomer and a vinyl radical polymerizable monomer in a base oil, and
the macromonomer is a macromonomer polymerized in the base oil.

20. The method for producing a polymer composition according to claim 19,
wherein an α-methylstyrene dimer is used as a chain transfer agent.

21. A lubricant composition comprising:
the polymer composition according to claim 1; and
a lubricant base oil.

22. A polymer composition comprising a (meth)acrylic copolymer A including,
a constituent unit derived from an alkyl methacrylate a1 of an alkyl group having 5 to 14 carbon atoms,
a constituent unit derived from an alkyl acrylate a2 of an alkyl group having 5 to 14 carbon atoms, and
a constituent unit derived from an alkyl acrylate a3 of an alkyl group having 1 to 4 carbon atoms,
the (meth)acrylic copolymer A further comprises a graft copolymer structure including,
a constituent unit derived from a vinyl radical polymerizable monomer m1 as a main chain of the graft copolymer structure, and
a constituent unit derived from a macromonomer M other than the vinyl radical polymerizable monomer m1 as a branch component of the graft copolymer structure, and
the (meth)acrylic copolymer A includes 1 to 50% by mass of the constituent unit derived from the alkyl methacrylate a1 with respect to a total mass of the (meth)acrylic copolymer A.

23. The polymer composition according to claim 22, wherein a differential distribution value in a differential molecular weight distribution curve, as measured by gel permeation chromatography, satisfies Equation 1

$$dMp30/dMp \geq 0.65 \qquad \text{Equation 1}$$

wherein in Equation 1 dMp30 is a differential distribution value of molecular weight corresponding to 30% of a peak top molecular weight dMp is a differential distribution value of the peak top molecular weight.

\* \* \* \* \*